May 6, 1941.  H. H. STYLL  2,240,725
OPHTHALMIC MOUNTING
Filed June 16, 1938
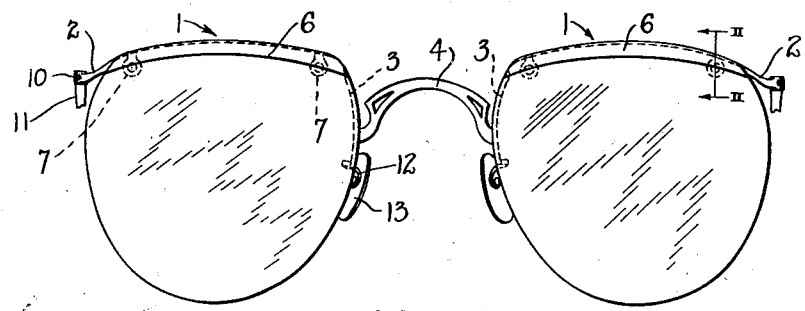
Fig. I
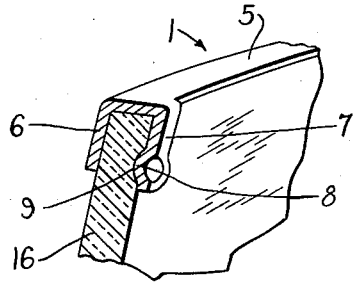
Fig. II
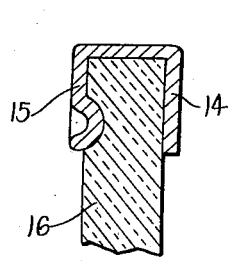
Fig. III
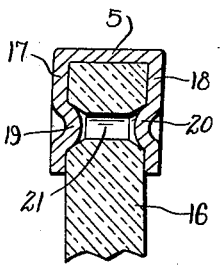
Fig. IV
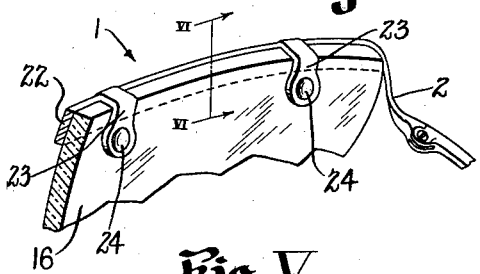
Fig. V
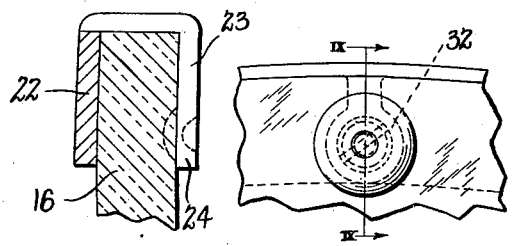
Fig. VI    Fig. VIII
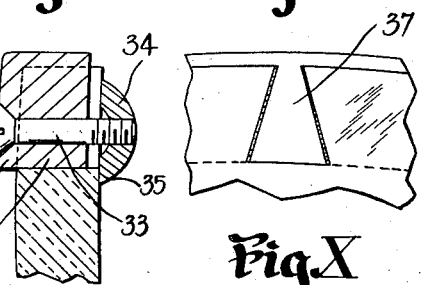
Fig. IX    Fig. X
Fig. VII
INVENTOR.
Harry H. Styll.

Patented May 6, 1941

2,240,725

UNITED STATES PATENT OFFICE 2,240,725

OPHTHALMIC MOUNTING

Harry H. Styll, Southbridge, Mass., assignor to American Optical Company, Southbridge, Mass., a voluntary association of Massachusetts Application June 16, 1938, Serial No. 214,067

2 Claims. (Cl. 88—47)

This invention relates to improvements in ophthalmic mountings and has particular reference to improved means of making the same.

One of the principal objects of the invention is to provide improved means of forming an ophthalmic mounting having its lens supporting means positioned above the useful field of vision and having a substantially rigid connection between the bridge and temple supporting portions thereof to which the lenses are attached and supported substantially free from shock and strain during the use of the mounting.

Another object is to provide a novel construction of mounting of the above character having lens supporting means which may be quickly and easily adjusted and attached to the lenses, with the said lenses relieved from shock and strain during use.

Another object is to provide an ophthalmic mounting of the above character which may be quickly and easily adjusted to the facial requirements of different individuals and to the different contour shapes and sizes of lenses.

Another object is to provide resilient holding means for connecting the lenses to their supporting means.

Other objects and advantages of the invention should become apparent from the following description taken in connection with the accompanying drawing and it will be apparent that many changes may be made in the details of construction, and arrangement of parts shown and described without departing from the spirit of the invention as expressed in the accompanying claims. I, therefore, do not wish to be limited to the exact details of construction, and arrangement of parts shown and described as the preferred forms have only been given by way of illustration.

Referring to the drawing:

Fig. I is a front elevation of an ophthalmic mounting embodying the invention;

Fig. II is a fragmentary enlarged partially sectioned perspective view taken as on line II—II of Fig. I;

Fig. III is a fragmentary sectional view of a modified form of the invention;

Fig. IV is a view generally similar to Fig. III showing a further modification;

Fig. V is a fragmentary perspective view of another modified form of the invention;

Fig. VI is a fragmentary sectional view taken as on line VI—VI of Fig. V;

Fig. VII is a fragmentary perspective view of a further modification showing the lens and its supporting means separated;

Fig. VIII is a fragmentary view of a further modification;

Fig. IX is a sectional view taken as on line IX—IX of Fig. VIII; and

Fig. X is a view generally similar to Fig. VIII illustrating a still further modification.

Ophthalmic mountings of the character described herein are designed particularly to have the desirable clear, unobstructed, visual characteristics of a rimless type mounting and at the same time have the desirable lens protective characteristics of a frame type mounting. Many attempts have been made, in the past, to provide such mountings. Much difficulty has been encountered, however, in providing lens supports which may be quickly and easily adjusted to compensate for the different sizes and contour shapes of lenses and to compensate for the different dimensional characteristics of the faces as well as the distances between the centers of the eyes of different individuals. Much difficulty has also been encountered in providing means for connecting the lenses to their supporting means whereby the said lenses will be relieved from shock and strain during use, and through which the lens supports may be quickly and accurately secured in position on the lenses with the remainder of the supporting parts fitted to the requirements of the individual for whom the mounting is being made.

The present invention, therefore, is directed particularly to the provision of an ophthalmic mounting having features which will overcome all of the difficulties set forth above in connection with prior art mountings and which will obtain the clear vision and strain free supporting results desired.

Referring more particularly to the drawing wherein like characters of reference designate like parts throughout the several views the device embodying the invention comprises, as shown in Figs. I and II, a pair of supporting bars 1 connected adjacent the temporal ends thereof with rearwardly extending relatively long temple supporting members 2 and connected adjacent the nasal ends thereof with depending supporting members 3. The said depending supporting members 3 are joined together by a suitable bridge 4 secured at its ends, intermediate the ends of the depending portions 3, by solder or other suitable means.

The supporting bars 1 are provided with a portion 5 shaped substantially to fit the upper contour edges of the lenses and have a depending lip 6 on the front side thereof shaped substantially to the front surface shape of the lenses adjacent the upper peripheral edges thereof. The portions 5 are provided with spaced depending relatively resilient lips 7 having their ends cupped, as illustrated at 8, to form suitable projections adapted to fit within recesses 9 formed in the rear surfaces of the lenses 16.

The supporting members 2, as previously stated above, are relatively long and extend rearwardly to the temple hinge connections 10 to which the temples 11 are pivotally attached and provide adjustable means whereby the distance between the temples may be increased or decreased by bending the said supporting members inwardly or outwardly. The said temples may be raised or lowered by bending the said portions 2 upwardly or downwardly relative to the upper peripheral edges of the lenses.

The depending portions 3 extend downwardly from the points of attachment of the bridge member 4 thereto and provide attaching means to which suitable guard arms or nose pad supporting means 12 are attached, as by solder or other suitable means. The said guard arms have nose bearing pads 13 pivotally attached thereto. It is apparent that the said guard arms 12 and depending portions 3 may be formed integral if desired.

In preparing the lenses for attachment to the supporting bars 1 the said lenses are edged to the desired contour shape and size. The portions 5 and 6 are then shaped to have a substantially intimate fit with the upper contour edges and front surfaces of the lenses adjacent said edges. The depending portions 3 and supporting members 2 are adjusted outwardly or inwardly a desired amount controlled by the width of the lenses between said supporting members and depending portions and also to control the width between the temples and the distance between the centers of the lenses. The recesses 9 are then formed in the rear surface of the lenses at points controlled by the positions at which the cupped ends 8 engage the rear surfaces of said lenses. The depths of said recesses are sufficient to enable the projecting portions 8 to be fitted therein and to properly retain the main bar portions 1 in desired fitted relation with the lenses.

In adjusting the depending portions 3 care is taken that the desired distance between the centers of the lenses will be obtained and that the said depending portions will be positioned substantially adjacent the nasal contour edges of the lenses and will be shaped substantially to the shape of said nasal edges.

With the above construction it is apparent that lenses of different sizes may be quickly and easily fitted with their supporting means and attached thereto by merely pressing the said lenses between the depending lips 6 and resilient lips 7 an amount sufficient to cause the upper portions 5 to fit substantially intimately with the upper contour edges of the lenses and the projections 8 to extend within the recesses 9. The resiliency of the depending lips 7 is sufficient to retain the lenses in position.

It is to be noted that the resilient lips 7, as illustrated in Fig. II, are positioned in the rear of the lens with the depending lips 6 positioned in the front of the lens. The construction may be reversed, however, as illustrated in Fig. III, wherein a continuous depending lip 14, corresponding to the lip 6, is positioned in the rear of the lens and resilient spaced lips 15, corresponding to the resilient lips 7, are positioned in front of the lens. The construction is otherwise generally similar to the construction illustrated in Fig. II.

In Fig. IV, there is illustrated a further modification wherein the portions 5, fitting the upper contour edges of the lenses, are provided with spaced continuous depending lips 17 and 18, each having spaced cupped portions 19 and 20 forming projections adapted to be seated within the opposed ends of spaced openings 21 formed in the lens 16. In this instance, the continuous depending lips 17 and 18 will be of a resilient nature so that the lens 16 may be placed in between said lips and pressed into fitted position whereby the projections 19 and 20 will fit within the opposed ends of the openings 21.

If desired, as illustrated in Figs. V and VI, the bar 1 may consist of a front lip 22 extending transversely of the lens and having spaced resilient clips 23, formed with cup-like ends 24, adapted to fit within suitable spaced recesses or openings formed in the lens 16. In this instance the temple supporting member 2 is formed as a continuation of the front lip 22 and is adapted to extend rearwardly and slightly outwardly and downwardly with respect to the lens. The said portion 2 may be formed relatively rigid, ductile or resilient as desired or may have portions thereof provided with one or more of said characteristics.

It is to be understood that the continuous lip 22 may be positioned in the rear of the lens with the said clips 23 positioned in the front, if desired.

In Fig. VII, there is shown a further modification wherein the bar 1 comprises a portion 25 shaped to fit the upper contour edge of the lens and an integral angled portion 26 shaped to fit the front surface of the lens adjacent the upper peripheral edge thereof. The portion 25 is provided with depending lugs 27 having enlarged ends shaped to fit within the correspondingly shaped openings or slots 28 in the lens. The parts are assembled by placing a suitable adhesive of cement on the lugs 27 and pressing the lens sidewise, from the rear of said angled portion 26, into fitted relation with said lugs and simultaneously into fitted relation with the portions 25 and 26. The adhesive or cement is allowed to set with the parts held in this relation. In this instance the portion 25 is provided with a downwardly and rearwardly extending relatively long temple support 29 to which the temple 30 is pivotally attached and has a bridge member 31 secured thereto or formed integral therewith adjacent its end opposed to the temple support 29. The said temple support 29 may be formed separate or integral with said portion 25. When the parts are in secured assembled relation with each other the lugs 27 fit within the slots 28 with the temple supporting portion 29 and depending end portion 31 fitting substantially intimately with the opposed upper side contour edges of the lenses.

In Figs. VIII and IX there is shown a further modification wherein connecting lugs 32, similar to the lugs 27, and openings or slots, similar to the slots 28, are provided.

In this instance, however, the said lugs 32 are provided with openings through which connecting screws or the like 33 may be extended. The said connecting screws or the like 33 are threadedly connected with cup like members 34 having a substantially circular edge 35 for engagement with the rear surface of the lens. These cup-like members 34, and connecting screws or the like 33, are adapted to secure the lens in fitted position on the lugs 32. The front continuous depending lip 36 is adapted to engage the front side of the lens.

Fig. X illustrates another modification wherein lugs 37 functioning similar to lugs 27 in Fig. VII are provided. The lugs 37 have a wedged shape and have a dove-tailed connection with the lens.

It is to be understood that the lugs 37 may be secured to the lens by a suitable cement or adhesive or may be provided with threaded openings in which connecting means such as screws having cup-like heads may be threadedly connected. In this instance the cup-like heads function similar to the cup-like members 34.

It is to be understood that although the depending lips, such as illustrated at 26, 36 and so forth, has been described as being shaped to engage the front surface of the lens, the said lips may be so formed as to engage the rear surface of the lens, if desired.

Ophthalmic mountings of the above construction have their supporting portions positioned above the useful field of vision and are so constructed that the lenses may be quickly and easily attached thereto.

The parts of such mountings are so formed that their dimensional characteristics may be quickly altered to compensate for variations in contour shapes and sizes of lenses and also to compensate for the variations in the facial characteristics of different individuals.

With the above arrangement the necessity of providing separate mountings having differently fixed dimensional characteristics is obviated. The general structural arrangement of the lens supporting portions and connecting means is such that the lenses may be quickly and easily attached to the lens supports and will be relieved from shock and strain during use. The various adjustable and fitted parts are such that they will maintain a more positive and desirable fitted relation with each other during use. One or both of the portions 2 and 3 or 29 and 31 may be formed resilient if desired to further aid in relieving the lenses from shock and strain.

From the foregoing description it will be seen that simple, efficient and economical means have been provided for accomplishing all of the objects and advantages of the invention.

Having described my invention, I claim:

1. An ophthalmic mounting for use with a pair of lenses each having an edge portion of predetermined shape with spaced recesses adjacent said edge portion, comprising rim sections shaped substantially to said edge portions, said sections having portions shaped to engage the opposed side surfaces of the lenses in substantially intimate relation therewith throughout the extent of said sections, and having parts shaped to overlie the edge surfaces of the lenses in close fitting relation therewith at least one of said portions which are shaped to engage the opposed side surfaces of the lenses being resilient and adapted to cause said portions to have a strong resilient clamping engagement with said opposed surfaces, with one of said portions having anchor means adapted to be interfitted with the respective recesses by snapping the rim section on to the lens and to hold the rim section in desired relation with the edge and side surfaces of the lens when in engagement with said recesses, said portions shaped to engage the opposed side surfaces of the lenses being spaced sufficiently to allow the pressing in of the lenses to assemble same by cam action with said anchor means.

2. An ophthalmic mounting comprising a pair of lenses each having an edge portion of predetermined shape with spaced recesses adjacent said edge portion, rim sections fitted to said edge portions, said sections having portions engaging the opposed side surfaces of the lenses in substantially intimate relation therewith throughout the extent of said sections, and having parts overlying the edge surfaces of the lenses in close fitting relation therewith, at least one of said portions engaging the opposed side surfaces being resilient and causing said portions to have a resilient clamping engagement with said opposed surfaces and one of said portions having anchor means interfitting with the respective recesses with the resilient portion holding the rim section in desired relation with the edge and side surfaces of the lens, said portions engaging the opposed side surfaces of the lenses having a resilient tendency toward each other against the lenses which is such that upon the removal of the lenses therefrom the said portions will remain in spaced relation with each other an amount sufficient to allow the pressing in of the lenses to assembled relation with said portions against the said anchor means in a cam action.

HARRY H. STYLL.